Feb. 18, 1969  L. J. WINDECKER  3,427,689
MOLD AND METHOD FOR THE PREPARATION THEREOF
Filed Nov. 21, 1966

INVENTOR.
Leo J. Windecker
BY
AGENT

United States Patent Office 3,427,689
Patented Feb. 18, 1969

3,427,689
MOLD AND METHOD FOR THE PREPARATION THEREOF
Leo J. Windecker, Midland, Tex., assignor to The Dow Chemical Company, Midland, Mich., a corporation of Delaware
Filed Nov. 21, 1966, Ser. No. 595,821
U.S. Cl. 18—47                16 Claims
Int. Cl. B27c 1/2

ABSTRACT OF THE DISCLOSURE

A mold particularly suited for the preparation of articles having a bright finish and prepared from reinforced epoxy resin is prepared from a pattern by applying and curing in sequence polyester gel coats, a coating of mixed polyester and epoxy containing 2-hydroxyalkyl acrylates or 2-hydroxyalkyl methacrylates and filled epoxy resin coat, glass reinforced epoxy resin coat and if desired a stiffening layer.

---

This invention relates to a mold and to a method for the preparation thereof, and more particularly relates to a non-metallic mold particularly suited for wet resin layup operation and a method for the production of such a mold.

Oftentimes when fabricating articles, particularly those of a reinforced synthetic resinous nature, the articles are prepared by conforming the various components of the article to a mold, causing the components to cure and subsequently removing the molded article from a molding surface. Oftentimes, the construction of a suitable mold having desirable characteristics of high dimensional stability, rapid fabrication, long service life, high quality surface and the like is difficult and expensive. Frequently, conventional molds present difficulty when the molding of components is carried out at varying temperatures and the factor of thermal expansion results in articles from the same mold of a different size. Oftentimes, conventional molds do not consistently provide a high quality product with a high gloss surface, particularly when employed in the formation of molded articles of glass fiber reinforced epoxy resins.

It would be desirable if there were available a mold and a method for the fabrication of a mold for use with glass fiber-epoxy resin systems which exhibits long service life, high quality surface and provides a mold which can withstand chemical and mechanical abuse and is not temperature sensitive.

These benefits and other advantages in accordance with the present invention are achieved in a method for the fabrication of a mold particularly adapted for use with epoxy resin-glass fiber reinforced systems, the steps of the method comprising providing a pattern, the pattern having a surface of a configuration desired to be reproduced, coating the surface of the pattern with a wavy release agent to form a continuous coating, optionally applying to the release agent a continuous coating of a clear unpigmented polyester gel coat, applying to the clear polyester gel coat a pigmented polyester gel coat, applying to the pigmented polyester gel coat a hardenable epoxy resin composition containing a half ester of a dicarboxylic acid anhydride and a hydroxy compound selected from the group consisting of 2-hydroxyalkyl acrylates and 2-hydroxyalkyl methacrylates and oxyalkylated derivatives thereof containing a pigment of contrasted color to the pigment contained in the pigmented gel coat, applying to the epoxy resin containing coating a hardenable rigid epoxy resin containing 50 to 70 weight percent of an inert solid filler, applying to the filled epoxy coating filamentary glass reinforcing and a hardenable rigid epoxy resin composition containing from about 50 to about 70 weight percent of an inert filler, then hardening the epoxy resin.

Also contemplated within the scope of the present invention is a mold particularly suited for the preparation of articles comprising rigid epoxy resins containing glass fiber reinforcing, the mold having a shaping surface, the shaping surface optionally comprising clear cured polyester gel coat adhered to a pigmented cured polyester gel coat, the pigmented polyester gel coat adhered to a cured coating of the reaction product of a curable epoxy resin and a half ester of a dicarboxylic acid anhydride and a hydroxy compound selector from the group consisting of 2-hydroxyalkyl acrylates and 2-hydroxyalkyl methacrylates and the oxyalkylated derivatives thereof. A layer adhered to the epoxy resin layer of a hardened epoxy resin containing 50 to 70 weight percent of a filler, at least one layer of filamentary glass and a hardened epoxy resin containing from 50 to 70 weight percent of a filler.

Further features and advantages of the present invention will become more apparent from the following specification when taken in connection with the drawing wherein.

Figure 1:
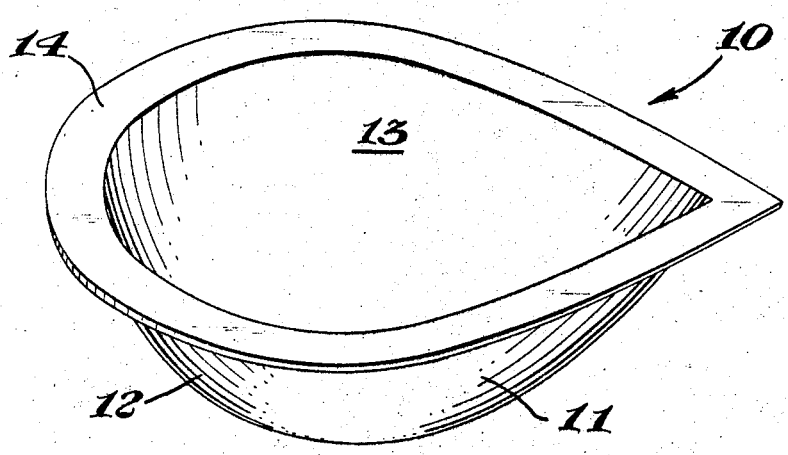
FIGURE 1 is a representation of a mold prepared in accordance with the invention.

In FIGURE 1 there is depicted a mold in accordance with the present invention generally designated by the reference numeral 10. The mold 10 comprises a body portion 11 having an external surface 12, a forming surface 13 having a high gloss and a desired configuration. The molding surface 13 terminates in a flange 14.

Figure 2:
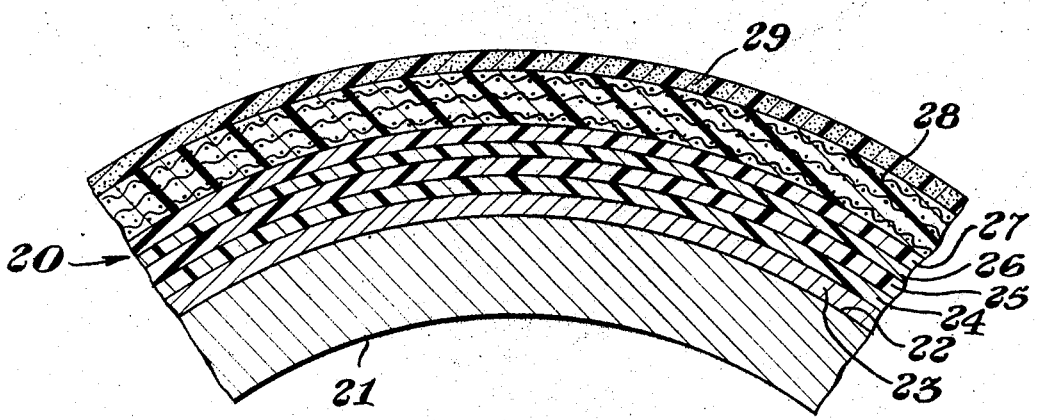
FIGURE 2 is a sectional view of a portion of a mold in accordance with the present invention adjacent a form or pattern.

In FIGURE 2 there is depicted a sectional view of a mold in accordance with the present invention generally designated by the reference numeral 20 in contact with a form or pattern 21. The pattern 21 has a surface of a desired configuration 22 having disposed on the surface thereof a waxy release agent 23, the release coat being a thin film and being of a continuous nature. A continuous film of clear polyester gel coat 24 is disposed on the surface of the release coat. A pigmented polyester coat 25 is disposed on the surface of the coat 24 and firmly adhered thereto. A continuous coating of a pigmented hardened resin 26 is adhered to the pigmented polyester coating 25. The resin in the coating 26 is the reaction product of the polyepoxide with a 2-hydroxyalkyl acrylate, 2-hydroxyalkyl methacrylate or oxyalkylated derivative thereof. An epoxy resin coating 27 is adhered to the coating 26. The epoxy resin coating 27 comprises a rigid epoxy resin in admixture with from about 50 to about 70 weight percent of an inert filler. A plurality of layers 28 are disposed on and adhered to the layer 27. The layers 28 comprise a glass fiber reinforcing and an epoxy resin matrix, the epoxy resin matrix is a mixture of hardened rigid epoxy resin containing from about 50 to about 70 weight percent filler. Adhered to the surface of the layers 28 most remote from the layer 27 is a layer 29 of stiffening material of sufficient thickness to provide a generally rigid mold.

In the practice of the method of the present invention and fabrication of molds in accordance with the invention, a wide variety of waxy mold release agents may be employed including natural waxes, synthetic polyethylene waxes, polyvinyl alcohol, low molecular weight polysiloxane waxes and polysiloxane oils having sufficient filler therein to provide a generally waxy or greasy product. Such mold release agents are well known in the art and need not further be described.

Beneficially the clear or first polyester gel coat is formed from a cross-linking polyester which is capable of curing to form a coating which is generally insoluble and infusible. Such a coat usually has a thickness of from about 1 to 5 mils. Typical of such polyester coatings are polyesters formed from phthalic anhydride and glycerine. Such cross-linking polyesters are well known in the art. The clear or lightly pigmented polyester coating is employed to provide faithful reproduction of the pattern surface and to provide a high gloss finish. Even in cases where the release coat applied to the mold may provide a smoothness which is less than desirable, the polyester gel coat is readily polished to provide a desirable high gloss finish. If desired the clear polyester coating may be pigmented to a level sufficient to provide color sufficient to provide depth indication when and if it is later desired to alter the configuration of the mold surface.

A pigmented gel coat can be prepared of like or different polyesters than are employed in the clear first gel coat. Beneficially, the pigmented gel coat has disposed therein a pigment of a pastel color such as pink, blue or green. The pastel colored gel coat in the finished product is disposed over a black coating and the pastel coating is of great assistance when a mold is damaged or must be altered a few thousandths of an inch as the color tends to change as the pigmented gel coat is sanded or otherwise removed in a repair or alteration of the mold. Usually such a coat is applied in a thickness of from about 1 to 10 mils.

Beneficially, the epoxy-acrylate or epoxy-methacrylate dicarboxylic acid layer contains a pigment of sharply contrasting color to the pigmented polyester gel coat and beneficially, an inert filler of either organic or inorganic nature. This coat advantageously is composed of from about 10 to 90 percent of a polyepoxide and from about 90 to 10 percent of a half ester of a dicarboxylic acid ester anhydride and a hydroxy compound selected from the group consisting of 2-hydroxyalkyl acrylates and 2-hydroxyalkyl methacrylates and oxyalkylated derivatives thereof. This coat beneficially provides additional depth indication where alteration of the configuration of the mold may be desired and provides a sectional bond between adjacent coats. The thickness of such a coat is usually between about 1 to 10 mils. The epoxy resins useful in the practice of the present invention are any rigid epoxy resins or polyepoxide reaction products which are filled with an inert filler such as clay, ground resin or the like. Beneficially, such a coating contains from about 50 to about 70 weight percent of filler. The filled epoxy coating serves to prevent any mark-through of the filamentary glass reinforcing subsequently employed. Usually, the filled epoxy coating beneficially is applied in thicknesses of from about 1/64 inch to about 1/8 inch depending on the size of the mold, the texture of the filamentary reinforcing, and the like.

Suitable filamentary glass reinforcing can be glass fabric of balanced or unbalanced weave alone or in combination with filamentary glass roving. In some instances, glass roving without glass cloth may be employed. The thickness of the filamentary glass-reinforced, filled, resin layer is dependent upon the size of the mold, the method of support employed for the mold, spacing between supports, and the like. However, in general for maximum rigidity and maximum accuracy, it is desirable to apply as much glass reinforcing and hardenable resin as is economically feasible. The resin such as epoxy resin beneficially is filled with an inert filling material to reduce shrinkage during curing to a minimum. When large molds are employed, generally it is beneficial to employ an external stiffening means as the uniform or non-uniform coating remote from the molding surface of the mold. Such stiffening means may be of epoxy or like hardening resin-impregnated wood stiffeners, an epoxy resin filled with a fine filler such as clay or a sand and gravel mixture employing an epoxy resin as a binder. Advantageously, such stiffening is also achieved employing a settable flexible foamed resin such as is disclosed by U.S. Patent 3,269,887.

Molds in accordance with the present invention may vary widely in size. For example, a mold having a maximum dimension of three or four inches is readily prepared from glass fiber such as roving and glass cloth and has adequate stiffness for most purposes. As the size of the mold increases, the requirement for external support increases if a mold of maximum position and minimum weight is obtained. Molds prepared in accordance with the present invention are eminently satisfactory for the preparation of bodies of epoxy resin-reinforced fiber glass and are particularly advantageous in that the coefficient of expansion of the mold and the product is substantially identical. For example, if the ambient temperature is 70° F. and the mold in accordance with the invention is employed to form a first article and a second article is subsequently formed using the mold at a temperature of 85° F., the resultant articles are the same size at the same temperature.

By way of further illustration, molds are prepared in the manner substantially as hereinbefore described employing clear polyester gel coats, pigmented gel coats, the reaction product of bisphenol A epoxy resin with maleic anhydride and 2-hydroxy ethyl acrylate; bisphenol A-derived epoxy resin, glass cloth and glass roving, the epoxy resin impregnating the glass cloth and the coat immediately adjacent the glass reinforcing having about 70 weight percent clay. The external surface of the mold is coated with a hardenable foam having a thickness of about one inch as described in my earlier U.S. Patent 3,269,887 to produce molds for a full scale, four place aircraft fuselage as well as other minor aircraft components. Excellent precision and finish on the products are obtained. Similar beneficial results are obtained when pigmented gel coats are employed which provide a smooth finish.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:
1. A method for the fabrication of a mold particularly adapted for use with epoxy resin-glass fiber reinforced systems, the steps of the method comprising:
providing a pattern, the pattern having
a surface of a configuration which is desired to be reproduced,
coating the surface of the pattern with a waxy release agent to form a continuous coating,
applying to the release agent a continuous coating of a first polyester gel coat, and curing the gel coat,
applying to the clear polyester gel coat a pigmented polyester gel coat, and curing the pigmented coat,
applying to the pigmented polyester gel coat an epoxy resin coat of a hardenable epoxy resin composition containing a half ester of a dicarboxylic acid anhydride and a hydroxy compound selected from the group consisting of 2-hydroxyalkyl acrylates and 2-hydroxyalkyl methacrylates and oxyalkylated derivatives thereof containing a pigment of contrasting color to the pigment contained in the pigmented gel coat, and curing the epoxy resin coat,
applying to the epoxy resin coating a filled epoxy coat of a hardenable rigid epoxy resin containing 50 to 70 weight percent of an inert solid filler, and curing the filled epoxy coat,
applying to the filled epoxy coating a filamentary glass reinforcing and a hardenable rigid epoxy resin con- taining from about 50 to about 70 weight percent of an inert filler, and hardening the epoxy resin.

2. The method of claim 1 wherein the first gel coat is unpigmented.

3. The method of claim 1 including the step of applying to the glass reinforced surface a desired quantity of a stiffening material having a coefficient of expansion generally similar to that of glass fiber reinforced epoxy resin.

4. The method of claim 3 wherein the stiffening material is an epoxy resin-sand-gravel mixture.

5. The method of claim 1 wherein the unpigmented polyester gel coat has a thickness of about from 1 to 5 mils.

6. The method of claim 5 wherein the pigmented gel coat has a thickness of from about 1 to 10 mils.

7. The method of claim 6 wherein the hardenable epoxy resin composition containing a pigment of contrasting color has a thickness of from about 1 to 10 mils.

8. The method of claim 3 wherein the stiffening material is a flexible synthetic resinous foam having a hardenable material therein.

9. The method of claim 1 wherein the filamentary glass reinforcing is glass cloth.

10. The method of claim 1 wherein the filamentary reinforcing a combination of glass cloth and glass roving.

11. A mold particularly suited for the preparation of articles comprising epoxy resin and glass fiber reinforcing, the mold having:
a shaping surface, the shaping surface comprising a first cured
polyester gel coat adhered to a pigmented cured polyester gel coat, the pigmented polyester gel coat adhered to a cured
coating of the reaction product of a curable epoxy resin and a half ester of a dicarboxylic acid anhydride and a hydroxy compound selected from the group consisting of 2-hydroxyalkyl acrylates and 2-hydroxyalkyl methacrylates and the oxyalkylated derivatives thereof, the coating of epoxy resin-hydroxy compound reaction product adhered to
a layer of a hardened epoxy resin containing 50 to 70 weight percent of a filler, the filled epoxy resin layer adhered to at least
one layer of the filamentary glass and a hardened epoxy resin containing 50 to 70 weight percent of filler.

12. The mold of claim 1 wherein the first gel coat is clear or unpigmented.

13. The mold of claim 11 including a plurality of adjacent layers of filamentary glass and filled, hardened epoxy resin.

14. The mold of claim 13 including a stiffening means remote from the shaping surface, the stiffening means having a coefficient of expansion approximating that of the epoxy resin-fiber glass composition.

15. The mold of claim 14 wherein the external stiffening means is a flexible foam having a hardened synthetic resin disposed therein.

16. The mold of claim 11 in operative combination with external support means.

References Cited

UNITED STATES PATENTS

| | | | |
|---|---|---|---|
| 2,907,070 | 10/1959 | Van Hartesveldt | 18—47 |
| 2,908,663 | 10/1959 | Masters | 260—837 |
| 3,150,118 | 9/1964 | Clemens | 260—78.5 |
| 3,215,763 | 11/1965 | Buerger | 264—220 |
| 3,239,590 | 3/1966 | Trimble | 264—226 |
| 3,269,887 | 8/1966 | Windecker | 161—160 |
| 3,295,818 | 1/1967 | Kreier | 249—134 |
| 3,317,178 | 5/1967 | Kreier | 249—134 |

JULIUS FROME, *Primary Examiner.*

JEFFERY R. THURLOW, *Assistant Examiner.*

U.S. Cl. X.R.

264—219, 337; 156—245; 161—160; 249—134